(12) United States Patent
Ogawa

(10) Patent No.: US 10,705,383 B2
(45) Date of Patent: Jul. 7, 2020

(54) IMAGE DISPLAY DEVICE

(71) Applicant: Funai Electric Co., Ltd., Daito, Osaka (JP)

(72) Inventor: Akihisa Ogawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/395,784

(22) Filed: Apr. 26, 2019

(65) Prior Publication Data
US 2019/0391452 A1 Dec. 26, 2019

(30) Foreign Application Priority Data
Jun. 21, 2018 (JP) .................................. 2018-117958

(51) Int. Cl.
*G09F 13/04* (2006.01)
*G02F 1/13357* (2006.01)

(52) U.S. Cl.
CPC .............................. *G02F 1/133615* (2013.01)

(58) Field of Classification Search
CPC ............ G02F 1/133615; G02B 6/0036; G02B 6/0038; G02B 6/0051; G02B 6/0053
See application file for complete search history.

(56) References Cited

U.S. PATENT DOCUMENTS

| | | | | |
|---|---|---|---|---|
| 5,557,433 A | * | 9/1996 | Maruyama | ........ G02F 1/133504 349/112 |
| 7,618,164 B2 | * | 11/2009 | Wang | .................... G02B 5/0221 362/339 |
| 8,848,132 B2 | * | 9/2014 | O'Neill | ................ G02B 6/0096 349/64 |
| 9,547,115 B2 | | 1/2017 | Kim et al. | |
| 10,216,039 B2 | * | 2/2019 | Kim | .................. G02F 1/133504 |
| 2002/0163790 A1 | * | 11/2002 | Yamashita | ............. G02B 5/045 362/612 |
| 2005/0024554 A1 | * | 2/2005 | Lee | ..................... G02B 6/0051 349/65 |

(Continued)

FOREIGN PATENT DOCUMENTS

| | | |
|---|---|---|
| EP | 3 187 926 A1 | 7/2017 |
| JP | 11-72625 A | 3/1999 |

OTHER PUBLICATIONS

The extended European Search Report of the European Application No. 19171664.6, dated Aug. 19, 2019.

*Primary Examiner* — Matthew J. Peerce
(74) *Attorney, Agent, or Firm* — Global IP Counselors, LLP

(57) ABSTRACT

An image display device includes a display panel, a plurality of light emitting elements, a reflective sheet, and a first optical sheet. The display panel displays an image on a front face of the display panel. The light emitting elements are disposed along one edge of the display panel. The reflective sheet is disposed opposite a rear face of the display panel. The reflective sheet reflects light from the light emitting elements toward the rear face of the display panel. The first optical sheet is disposed between the display panel and the reflective sheet. The first optical sheet has a plurality of protrusions on a face of the first optical sheet that is opposite the reflective sheet. The protrusions have ridgelines extending along a direction that is different from a direction in which the one edge of the display panel extends.

18 Claims, 8 Drawing Sheets

(56) References Cited

U.S. PATENT DOCUMENTS

| | | | |
|---|---|---|---|
| 2005/0280752 A1* | 12/2005 | Kim | G02B 5/0221 349/62 |
| 2010/0296270 A1* | 11/2010 | Gomi | G02F 1/133605 362/97.3 |
| 2011/0261584 A1* | 10/2011 | Boyd | G02B 6/0053 362/607 |
| 2013/0163277 A1 | 6/2013 | Kim et al. | |
| 2015/0055366 A1* | 2/2015 | Chang | G02B 6/0036 362/606 |
| 2017/0269285 A1* | 9/2017 | Hirayama | G02B 6/0036 |

\* cited by examiner

IMAGE DISPLAY DEVICE

CROSS-REFERENCE TO RELATED APPLICATIONS

This application claims priority to Japanese Patent Application No. 2018-117958 filed on Jun. 21, 2018. The entire disclosure of Japanese Patent Application No. 2018-117958 is hereby incorporated herein by reference.

BACKGROUND

Field of the Invention

This invention generally relates to an image display device for displaying images.

Background Information

There are known image display devices for displaying images. An image display device comprises a display panel and a backlight for shining light on the rear face of the display panel. One known type of backlight is a hollow backlight that does not make use of a light guide plate (see Japanese Patent Application Publication No. H11-72625 (Patent Literature 1), for example).

A hollow backlight has a light source, a reflective sheet that is disposed opposite the rear face of the display panel, and a diffusion sheet that is disposed between the display panel and the reflective sheet. The light from the light source travels through a hollow region formed between the reflective sheet and the diffusion sheet, and is reflected by the reflective sheet, after which it is incident on the diffusion sheet. The light incident on the diffusion sheet is emitted from the diffusion sheet while being diffused, and is shined on the rear face of the display panel.

SUMMARY

However, with the above-mentioned conventional image display device, the region of the display panel that is near the light source is locally brighter, which is a problem in that the light is uneven on the display panel.

One object is to provide an image display device with which light unevenness on a display panel can be suppressed.

In view of the state of the known technology and in accordance with an aspect of the present invention, an image display device comprises a display panel, a plurality of light emitting elements, a reflective sheet, and a first optical sheet. The display panel displays an image on a front face of the display panel. The light emitting elements are disposed along one edge of the display panel. The reflective sheet is disposed opposite a rear face of the display panel. The reflective sheet reflects light from the light emitting elements toward the rear face of the display panel. The first optical sheet is disposed between the display panel and the reflective sheet. The first optical sheet has a plurality of protrusions on a face of the first optical sheet that is opposite the reflective sheet. The protrusions have ridgelines extending along a direction that is different from a direction in which the one edge of the display panel extends.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. The embodiments described below are all comprehensive or specific examples. The numerical values, shapes, materials, constituent elements, layout positions and connection modes of the constituent elements, and so forth given in the following embodiments are all just examples, and are not intended to limit the present invention. Also, of the constituent elements in the following embodiments, those not mentioned in an independent claim will be described as optional constituent elements.

First Embodiment 1-1. Overall Configuration of Image Display Device

Figure 1:
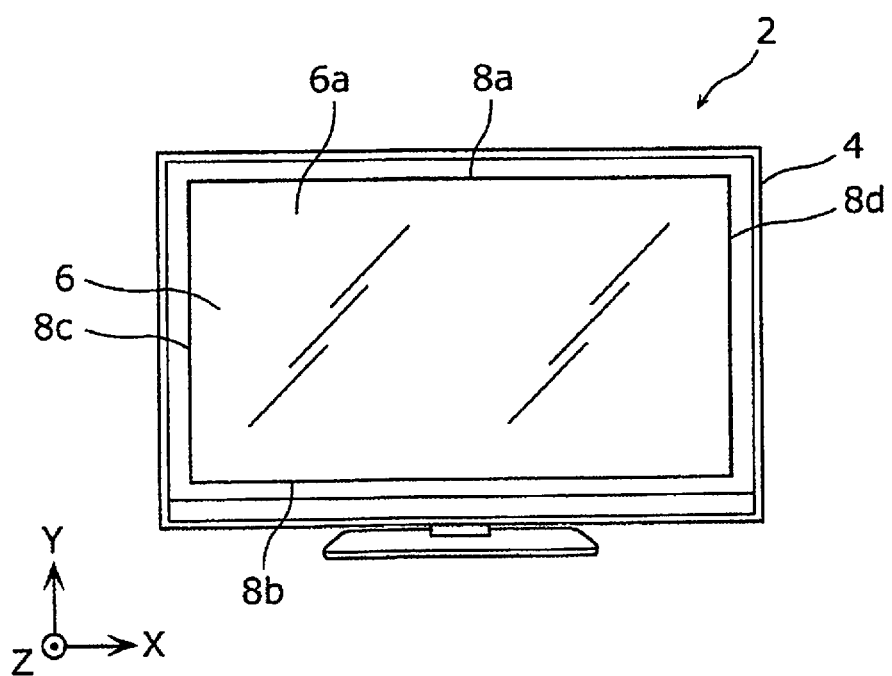
FIG. 1 is a front elevational view of an image display device according to a first embodiment.
Figure 2:
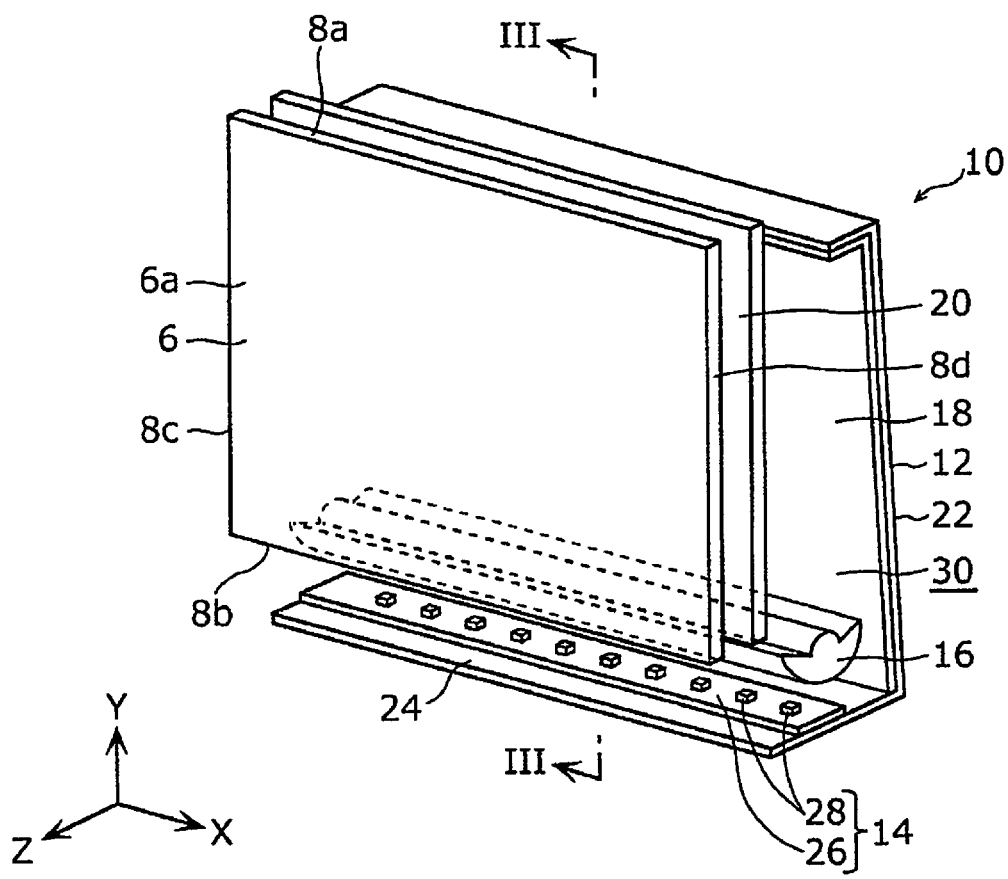
FIG. 2 is a perspective view of the internal structure of the image display device according to the first embodiment.
Figure 3:
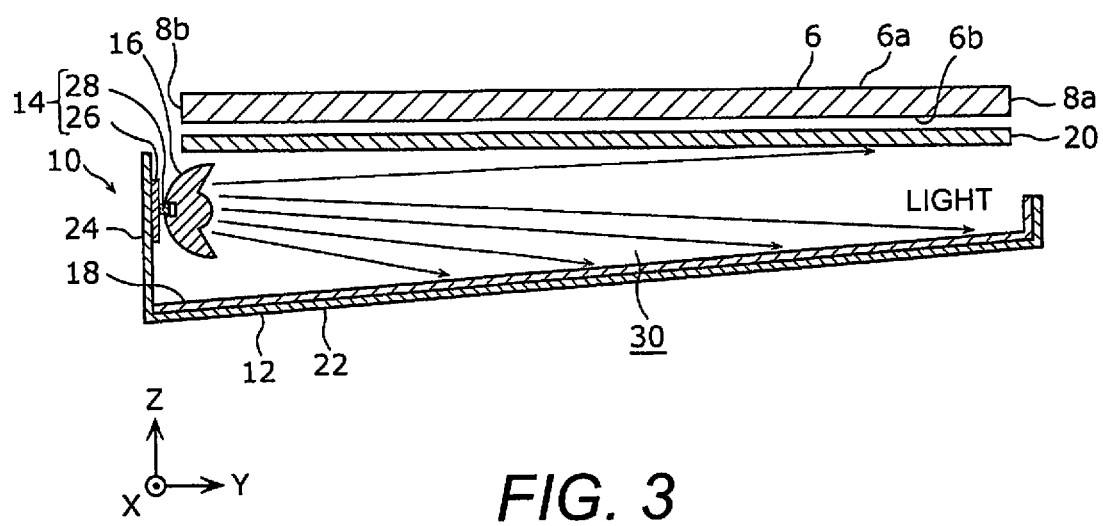
FIG. 3 is a cross sectional view of the image display device according to the first embodiment taken along the line in FIG. 2.

First, the overall configuration of an image display device 2 according to a first embodiment will now be described through reference to FIGS. 1 to 3. FIG. 1 is a front elevational view of the image display device 2 according to the first embodiment. FIG. 2 is a perspective view of the internal structure of the image display device 2 according to the first embodiment. FIG. 3 is a cross sectional view of the image display device 2 according to the first embodiment taken along the III-III line in FIG. 2.

As shown in FIG. 1, the image display device 2 is a liquid crystal television set, for example. The image display device 2 comprises a housing 4 and a display panel or display 6 disposed on the front face of the housing 4.

The display panel 6 is a liquid crystal cell formed in a rectangular shape in XY plan view. An image is displayed on the front face 6a of the display panel 6. Of the four edges of the display panel 6, the upper edge 8a and the lower edge 8b extend in the horizontal direction (the X axis direction), and the left edge 8c and the right edge 8d extend in the vertical direction (the Y axis direction).

As shown in FIGS. 2 and 3, a backlight 10 for shining light toward the rear face 6b of the display panel 6 is disposed inside the housing 4. For the sake of description, the housing 4 is not depicted in FIGS. 2 and 3.

The backlight 10 is a hollow type of backlight in which no light guide plate is used. The backlight 10 has a rear frame 12, an LED bar 14, a lens 16, a reflective sheet 18, and an optical sheet unit 20.

The rear frame 12 is a frame for supporting the LED bar 14, the reflective sheet 18, and the like, and for dissipating heat from the LED bar 14. The rear frame 12 is formed from a metal having high thermal conductivity, such as aluminum. The rear frame 12 has a main body portion 22 and a side wall portion 24.

The main body portion 22 is disposed opposite the rear face 6b of the display panel 6. As shown in FIG. 3, the main body portion 22 is disposed at an angle to the rear face 6b of the display panel 6, and the distance between the main body portion 22 and the rear face 6b of the display panel 6 gradually decreases moving away from the side wall portion 24. Thus, the reflective sheet 18 is disposed at an angle to the rear face 6b of the display panel 6 such that the reflective sheet 18 and the display panel 6 converge as moving away from the lower edge 8b of the display panel 6. The side wall portion 24 is bent from one end of the main body portion 22 toward the lower edge 8b side of the display panel 6 (an example of one edge of the display panel 6), and extends in a slender shape along the lower edge 8b of the display panel 6. Also, as shown in FIG. 3, the rear frame 12 has a top wall portion bent from the other end of the main body portion 22 opposite the one end of the main body portion 22 from which the side wall portion 24 extends. The main body portion 22 supports the reflective sheet 18 and is inclined with respect to the rear face 6b of the display panel 6.

The LED bar 14 is a light source for emitting light. The LED bar 14 has a substrate 26 and a plurality of light emitting elements 28. The substrate 26 is a slender printed wiring board for mounting the light emitting elements 28. The substrate 26 is attached to the side wall portion 24 of a rear frame 12 by double-sided tape (not shown) having thermal conductivity. The substrate 26 is formed from a metal with high thermal conductivity, such as aluminum. Each of the light emitting elements 28 is, for example, a chip type LED (light emitting diode). The light emitting elements 28 are mounted on the substrate 26 and are disposed spaced apart in the lengthwise direction (the X axis direction) of the substrate 26. That is, the light emitting elements 28 are disposed along the lower edge 8b of the display panel 6. In the illustrated embodiment, the LED bar 14 is utilized as the light source. However, the image display device 2 can include different type of light sources, as needed and/or desired.

The lens 16 is a condensing lens for condensing the light from the light emitting elements 28. The lens 16 extends in a slender shape in the direction in which the light emitting elements 28 are disposed, and is disposed opposite the light emitting faces of the light emitting elements 28. Thus, the lens 16 is arranged relative to the light emitting elements 28 along the lower edge 8b of the display panel 6.

The reflective sheet 18 is a sheet for reflecting light from the light emitting elements 28 toward the rear face 6b of the display panel 6 (that is, toward a first prism sheet 32 (discussed below)). The reflective sheet 18 is supported by the main body portion 22 of the rear frame 12, and is disposed opposite the rear face 6b of the display panel 6.

The optical sheet unit 20 is a unit in which a plurality of optical sheets are stacked on each other. The optical sheet unit 20 is disposed between the display panel 6 and the reflective sheet 18. Consequently, a hollow region 30, which becomes the region through which light from the light emitting elements 28 passes, is formed between the optical sheet unit 20 and the reflective sheet 18. The configuration of the optical sheet unit 20 will be described in detail below.

1-2. Configuration of Optical Sheet Unit

Figure 4:
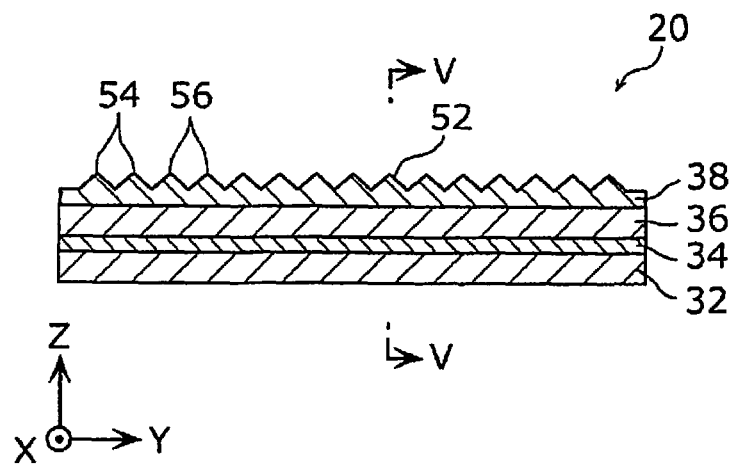
FIG. 4 is a schematic cross sectional view of an optical sheet unit of the image display device shown in FIG. 3.
Figure 5:
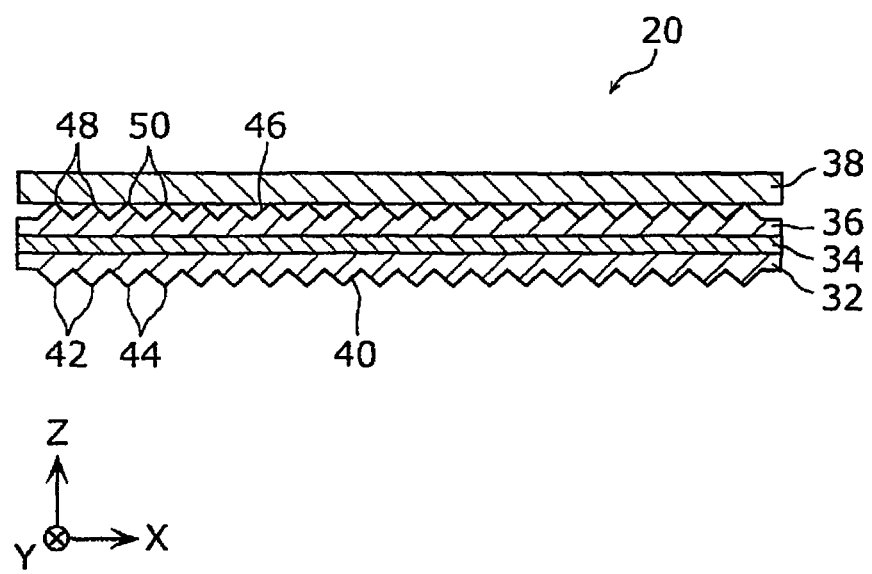
FIG. 5 is a schematic cross sectional view of the optical sheet unit taken along the V-V line in FIG. 4.
Figure 6:
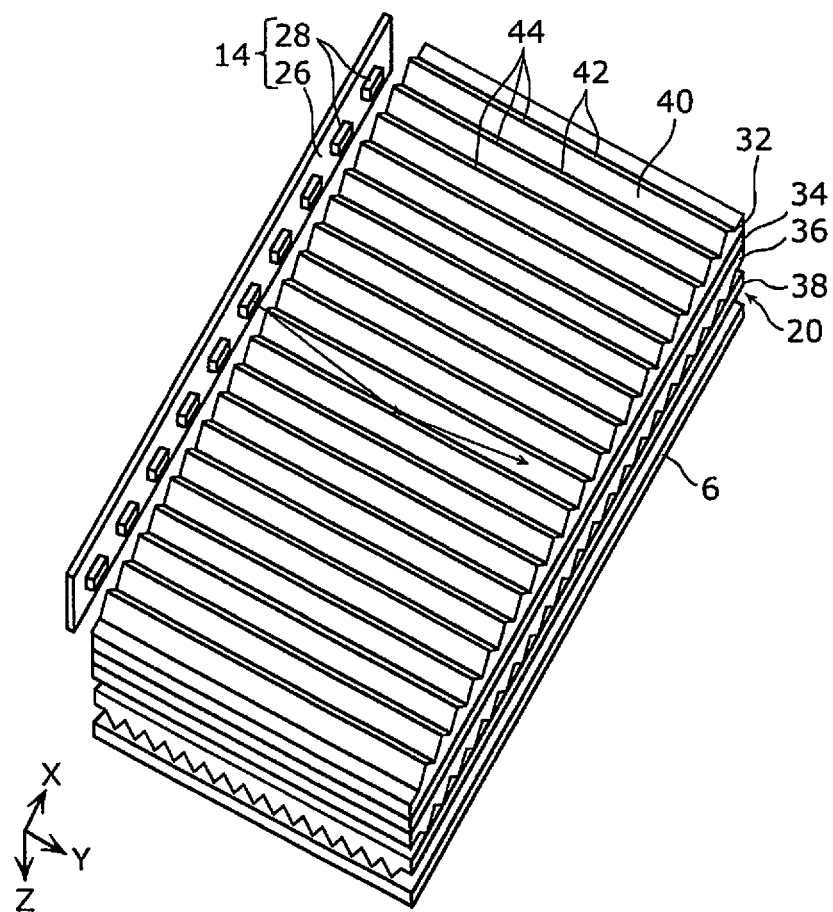
FIG. 6 is a schematic perspective view of the optical sheet unit, an LED bar, and a display panel of the image display device according to the first embodiment.

Next, the configuration of the optical sheet unit 20 will be described through reference to FIGS. 4 to 6. FIG. 4 is a is a schematic cross sectional view of the optical sheet unit 20 shown in FIG. 3. FIG. 5 is a schematic cross sectional view of the optical sheet unit 20 taken along the V-V line in FIG. 4. FIG. 6 is a schematic perspective view of the optical sheet unit 20, the LED bar 14, and the display panel 6 of the image display device 2 according to the first embodiment.

As shown in FIGS. 4 and 5, the optical sheet unit 20 has, as its plurality of optical sheets, the first prism sheet 32 (an example of a first optical sheet), a diffusion sheet 34 (an example of a second optical sheet), a second prism sheet 36 (an example of a second optical sheet), and a third prism sheet 38 (an example of a third optical sheet). The first prism sheet 32, the diffusion sheet 34, the second prism sheet 36, and the third prism sheet 38 are stacked in this order. The first prism sheet 32 is disposed opposite the reflective sheet 18, and the third prism sheet 38 is disposed opposite the rear face 6b of the display panel 6.

The first prism sheet 32 is an optical sheet for guiding light from the plurality of light emitting elements 28 in a specific direction. More specifically, the first prism sheet 32 guides the light from the light emitting elements 28 in a direction from the lower edge 8b of the display panel 6 to the upper edge 8a (the positive direction of the Y axis). The first prism sheet 32 is formed from polybutyl methacrylate (PBMA), for example. The first prism sheet 32 is disposed between the display panel 6 and the reflective sheet 18. The first prism sheet 32 directly faces the reflective sheet 18.

As shown in FIGS. 5 and 6, a prism face 40 is formed on the face of the first prism sheet 32 that is opposite the reflective sheet 18. A plurality of protrusions 42 are formed on the prism face 40. Each of the protrusions 42 is formed in a triangular prism shape. The protrusions 42 have a plurality of ridgelines 44 forming the top portions of the triangular prisms. That is, the cross sectional shape perpendicular to the ridgeline 44 of each protrusion 42 is triangular. The ridgelines 44 are disposed parallel to each other, and extend in a direction (Y axis direction) perpendicular to the direction in which the lower edge 8b of the display panel 6 extends (X axis direction). That is, the ridgelines 44 extend in a direction that is different from the direction in which the lower edge 8b of the display panel 6 extends. The thickness of the first prism sheet 32 is 288 mm, for example. The spacing of the ridgelines 44 in the X axis direction is 52 μm, for example. The face of the first prism sheet 32 on the opposite side from the prism face 40 is formed in a flat shape.

As shown in FIGS. 4 and 5, the diffusion sheet 34 is an optical sheet for diffusing the light emitted from the first prism sheet 32. The diffusion sheet 34 is superimposed on the face of the first prism sheet 32 on the opposite side from the prism face 40.

As shown in FIG. 5, the second prism sheet 36 is an optical sheet for suppressing the spreading of the light emitted from the diffusion sheet 34 in the X axis direction. The second prism sheet 36 is superimposed on the face of the diffusion sheet 34 on the opposite side from the face opposite first prism sheet 32. A prism face 46 is formed on the face of the second prism sheet 36 on the opposite side from the face opposite the diffusion sheet 34. A plurality of protrusions 48 are formed on the prism face 46. Each of the plurality of protrusions 48 is formed in a triangular prism shape. The protrusions 48 have ridgelines 50 forming the top portions of the triangular prisms. The ridgelines 50 are disposed in parallel to each other, and extend in the same direction as the ridgelines 44 of the first prism sheet 32. The face of the second prism sheet 36 on the opposite side from the prism face 46 is formed in a flat shape. Thus, the second prism sheet 36 has the protrusions 48 on the face of the second optical sheet 36 that faces away from the first prism sheet 32.

As shown in FIG. 4, the third prism sheet 38 is an optical sheet for suppressing the spreading of the light emitted from the second prism sheet 36 in the Y axis direction. The third prism sheet 38 is superimposed on the prism face 46 of the second prism sheet 36. A prism face 52 is formed on the face of the third prism sheet 38 that is on the opposite side from the second prism sheet 36. A plurality of protrusions 54 are formed on the prism face 52. Each of the protrusions 54 is formed in a triangular prism shape. The protrusions 54 have ridgelines 56 forming the top portions of the triangular prisms. The ridgelines 56 are disposed in parallel to each other, and extend in a direction (X axis direction) perpendicular to the ridgelines 50 of the second prism sheet 36. The face of the third prism sheet 38 on the opposite side from the prism face 52 is formed in a flat shape. Thus, the third prism sheet 38 is disposed between the second prism sheet 36 and the display panel 6. Also, the third prism sheet 38 has the protrusions 54 on the face of the third prism sheet 38 that faces away from the second prism sheet 36. The protrusions 54 of the third prism sheet 38 have the ridgelines 56 extending in a direction perpendicular to the ridgelines 44 of the first prism sheet 32.

1-3. Effect

The effect obtained with the image display device 2 described above will now be described through reference to FIGS. 3 and 6.

As shown in FIG. 3, the light from the light emitting elements 28 is condensed by the lens 16 and then travels through the hollow region 30. At this point, if the first prism sheet 32 were not provided to the backlight 10, the light would be incident on the diffusion sheet 34 at a shallow angle and pass through the diffusion sheet 34. That is, most of the light from the light emitting elements 28 would pass through the region of the diffusion sheet 34 that is near the LED bar 14. As a result, the region of the display panel 6 near the LED bar 14 would become locally brighter, so there would be light unevenness in the display panel 6.

On the other hand, with this embodiment, as shown in FIG. 6, the first prism sheet 32 is provided to the backlight 10, and the prism face 40 is formed on the face of the first prism sheet 32 that is opposite the reflective sheet 18. The protrusions 42 formed on the prism face 40 have the ridgelines 44. The ridgelines 44 are disposed parallel to each other, and extend in a direction perpendicular to the direction in which the lower edge 8b of the display panel 6 extends. The light from the light emitting elements 28 passes through the hollow region 30, and is emitted toward the ridgelines 44 of the first prism sheet 32.

Consequently, since the light from the light emitting elements 28 is incident on the protrusions 42 of the first prism sheet 32 at many different angles, the light tends to be totally reflected by the surfaces of the protrusions 42. This light that has been totally reflected by the surfaces of the protrusions 42 is reflected by the reflective sheet 18 before being incident on the prism face 40 of the first prism sheet 32. In this way, light from the light emitting elements 28 is guided by the prism face 40 of the first prism sheet 32 in the direction from the lower edge 8b to the upper edge 8a of the display panel 6, while travelling through the hollow region 30. Therefore, the light from the light emitting elements 28 is transmitted not only to the region of the first prism sheet 32 that is near the LED bar 14, but also to the regions farther away from the LED bar 14 in the Y axis direction. As a result, it is possible to suppress local brightness in the region of the display panel 6 near the LED bar 14, and light unevenness can be suppressed in the display panel 6.

Figure 7A:
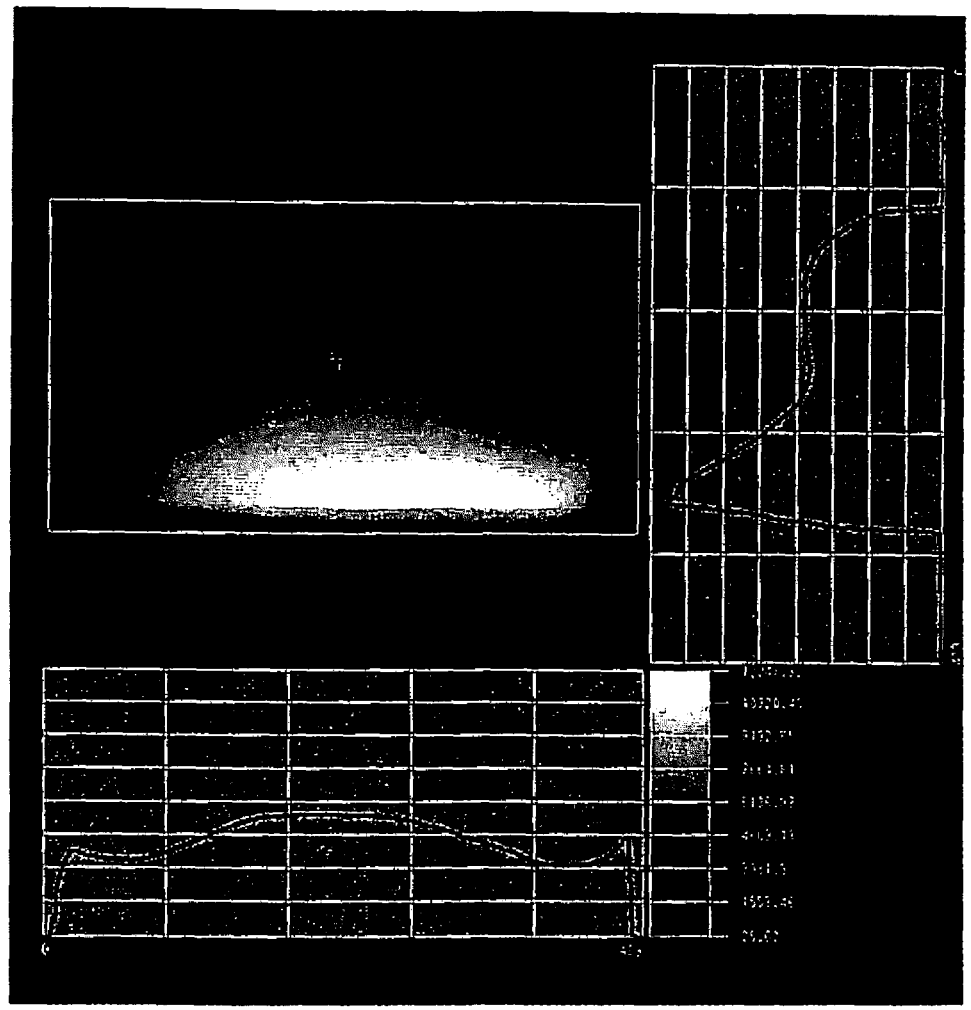
FIG. 7A is a diagram showing the luminance distribution in a display panel of an image display device according to a comparative example.
Figure 7B:
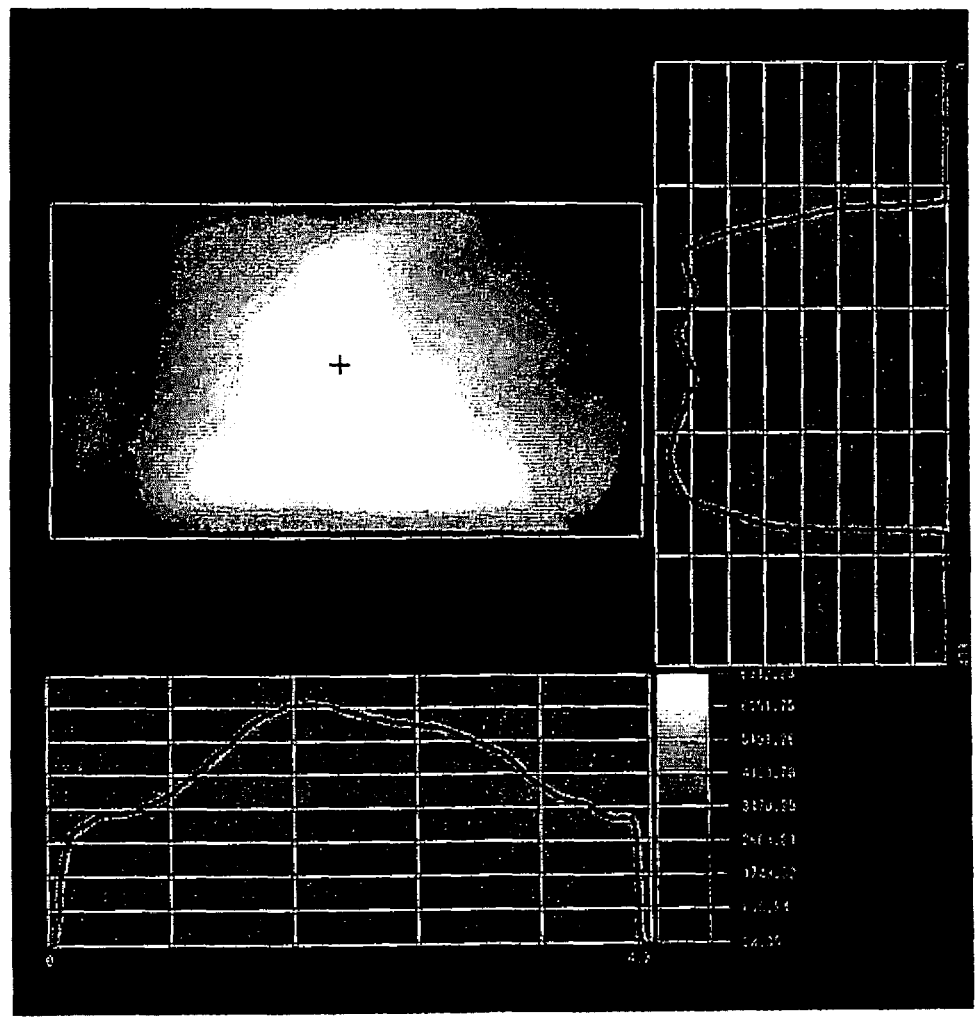
FIG. 7B is a diagram showing the luminance distribution in the display panel of the image display device according to a working example of the first embodiment.

In order to confirm the above-mentioned effect, the following experiment is conducted. FIG. 7A is a diagram showing the luminance distribution in a display panel of an image display device according to a comparative example. FIG. 7B is a diagram showing the luminance distribution in the display panel of the image display device according to a working example of the first embodiment.

In the comparative example, the rear face of a 55-inch display panel is irradiated with a hollow backlight, and the luminance of the display panel is measured. The optical sheet unit used in the backlight is one in which a diffusion sheet, a second prism sheet, and a third prism sheet are stacked in that order, meaning that only the first prism sheet from the optical sheet unit in the above embodiment is missing.

In the working example, the rear face of a 55-inch display panel is irradiated with a hollow backlight, and the luminance of the display panel is measured. The optical sheet unit used in the backlight is one in which a first prism sheet, a diffusion sheet, a second prism sheet, and a third prism sheet are stacked in that order, just as in the optical sheet unit 20 of the above embodiment.

In FIGS. 7A and 7B, the upper-left distribution diagram shows the two-dimensional luminance distribution in the display panel. With this luminance distribution, the luminance is greater as the color becomes whiter, and the luminance is lesser as the color becomes blacker. In the upper-left luminance distribution, the left and right direction indicates the horizontal direction (X axis direction), and the up and down direction indicates the vertical direction (Y axis direction). In addition, in FIGS. 7A and 7B, the upper-right graph shows the one-dimensional luminance distribution in the vertical direction (Y axis direction) of the display panel. Also, in FIGS. 7A and 7B, the lower-left graph shows the one-dimensional luminance distribution in the horizontal direction (X axis direction) of the display panel.

As shown in FIG. 7A, in the experiment results of the comparative example, the region of the display panel near the LED bar (the lower region in FIG. 7A) is locally brighter, and there is light unevenness in the display panel.

On the other hand, as shown in FIG. 7B, in the experiment results of the working example, the entire region of the display panel has substantially uniform brightness. Consequently, it is confirmed that the working example has the effect of suppressing light unevenness in the display panel.

Second Embodiment

Figure 8:
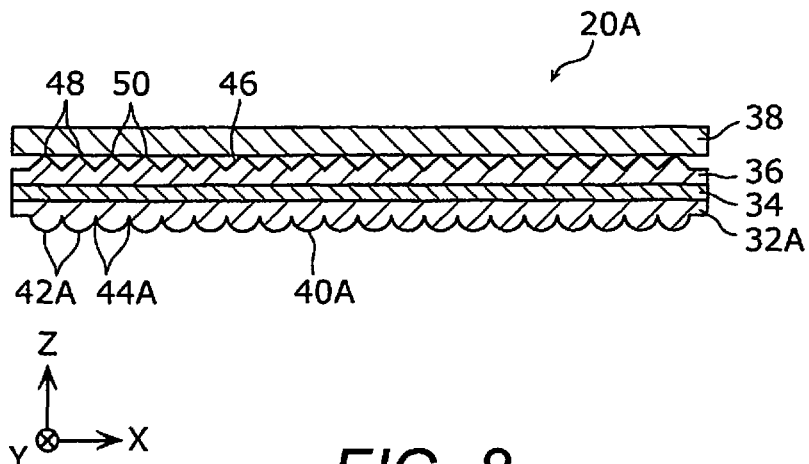
FIG. 8 is a schematic cross sectional view of an optical sheet unit of an image display device according to a second embodiment.

An optical sheet unit 20A according to a second embodiment will now be described through reference to FIG. 8. FIG. 8 is a schematic cross sectional view of an optical sheet unit 20A of an image display device according to the second embodiment. In each of the following embodiments, those components that are the same as in the first embodiment are numbered the same and will not be described again. Specifically, the image display device according to the second embodiment is substantially identical to the image display device 2 according to the first embodiment, except that the image display device according to the second embodiment includes the optical sheet unit 20A instead of the optical sheet unit 20.

As shown in FIG. 8, with the optical sheet unit 20A according to the second embodiment, each of the plurality of protrusions 42A formed on a prism face 40A of a first prism sheet 32A is formed in a semi-cylindrical shape. The protrusions 42A have ridgelines 44A that form the side edges of the semicircular columns. That is, the cross sectional shape perpendicular to the ridgelines 44A of the protrusions 42A is an arc shape. Forming the protrusions 42A in this way yields the same effect as in the first embodiment above.

Figure 9:
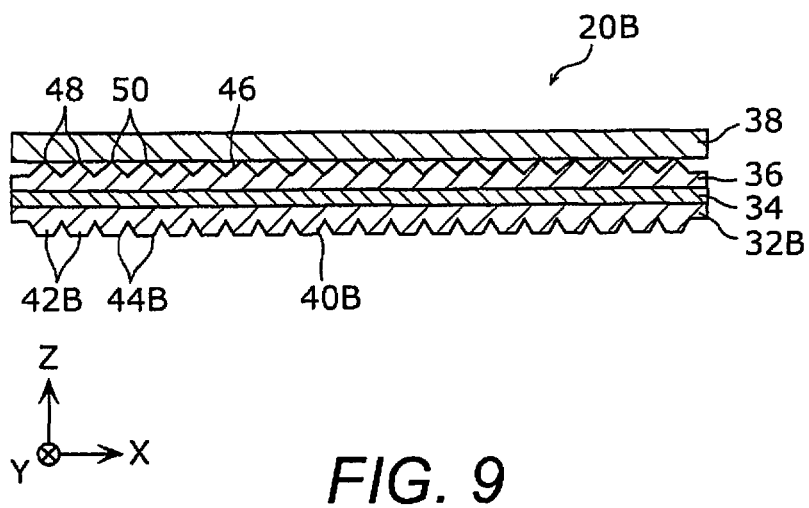
FIG. 9 is a schematic cross sectional view of an optical sheet unit of an image display device according to a modification example of the second embodiment.

The protrusions 42A are not limited to the above-mentioned semi-cylindrical shape, and can be formed in various shapes. FIG. 9 is a schematic cross section of an optical sheet unit 20B according to a modification example of the second embodiment. As shown in FIG. 9, with the optical sheet unit 20B according to this modification example, each of the protrusions 42B formed on the prism face 40B of the first prism sheet 32B is formed in a quadrangular prism shape. The protrusions 42B have ridgelines 44B that form the side edges of the quadrangular prisms. That is, the cross sectional shape perpendicular to the ridgelines 44B of the protrusions 42B is trapezoidal. Forming the protrusions 42B in this way yields the same effect as in the first embodiment above.

Third Embodiment

Figure 10:
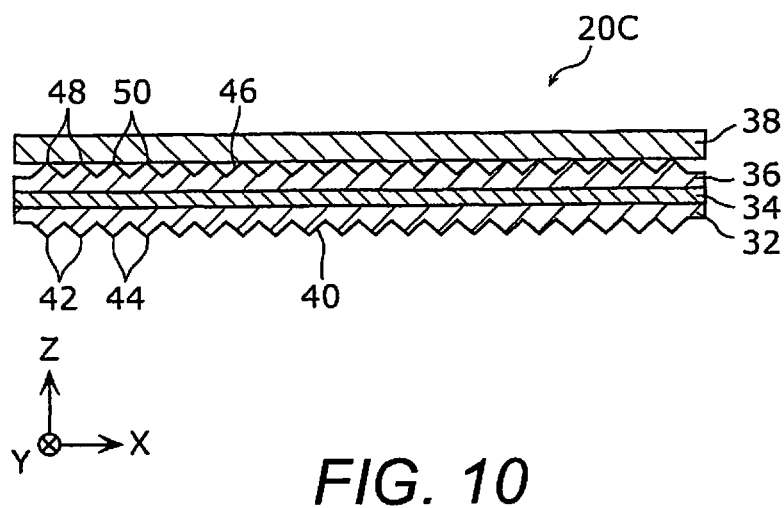
FIG. 10 is a schematic cross sectional view of an optical sheet unit according to a third embodiment.

An optical sheet unit 20C according to a third embodiment will now be described through reference to FIG. 10. FIG. 10 is a schematic cross sectional view of an optical sheet unit 20C of an image display device according to the third embodiment. Specifically, the image display device according to the third embodiment is substantially identical to the image display device 2 according to the first embodiment, except that the image display device according to the third embodiment includes the optical sheet unit 20C instead of the optical sheet unit 20.

As shown in FIG. 10, with the optical sheet unit 20C according to the third embodiment, the first prism sheet 32, the diffusion sheet 34, the second prism sheet 36, and the third prism sheet 38 are formed integrally by lamination processing. This makes the optical sheet unit 20C easier to handle.

Fourth Embodiment

Figure 11:
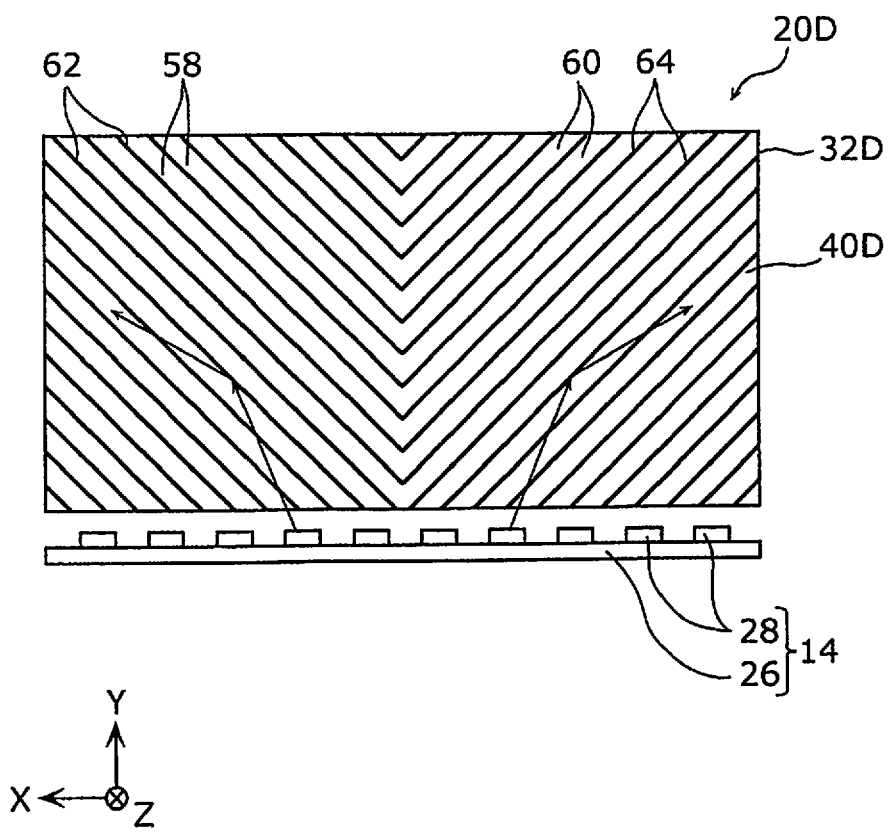
FIG. 11 is a schematic diagram showing an optical sheet unit and an LED bar according to a fourth embodiment.

The optical sheet unit 20D according to a fourth embodiment will now be described through reference to FIG. 11. FIG. 11 is a schematic diagram showing an optical sheet unit 20D and the LED bar 14 of an image display device according to the fourth embodiment. Specifically, the image display device according to the fourth embodiment is substantially identical to the image display device 2 according to the first embodiment, except that the image display device according to the fourth embodiment includes the optical sheet unit 20D instead of the optical sheet unit 20.

As shown in FIG. 11, with the optical sheet unit 20D according to the fourth embodiment, a plurality of first protrusions 58 and a plurality of second protrusions 60 are formed on the prism face 40D of a first prism sheet 32D. Each of the first protrusions 58 and the second protrusions 60 is formed in a triangular prism shape. The first protrusions 58 have first ridgelines 62 forming the top portions of the triangular prisms. In addition, the second protrusions 60 have second ridgelines 64 forming the top portions of the triangular prisms.

The first ridgelines 62 are disposed parallel to each other, and extend at an angle of +45°, for example, with respect to the direction in which the lower edge 8b of the display panel 6 extends. That is, the first ridgelines 62 extend along a first direction that is different from the direction in which the lower edge 8b of the display panel 6 extends.

The second ridgelines 64 are disposed parallel to each other, and extend at an inclination of −45°, for example, with respect to the direction in which the lower edge 8b of the display panel 6 extends. That is, the second ridgelines 64 extend along a second direction that is different from the direction in which the lower edge 8b of the display panel 6 extends and the first direction. Thus, each of the first protrusions 58 is identical to the protrusion 42 shown in FIG. 5, except that the first protrusions 58 extends diagonally with respect to the X axis direction and the Y axis direction towards. Also, each of the second protrusions 60 is identical to the protrusion 42 shown in FIG. 5, except that the second protrusions 60 extends diagonally with respect to the X axis direction and the Y axis direction. In the illustrated embodiment, each of the first protrusions 58 extends perpendicular to each of the second protrusions 60 such that the first protrusions 58 and the second protrusions 60 diverge as moving away from the lower edge 8b of the display panel 6 (as moving away from the LED bar 14). In other words, as illustrated in FIG. 11, the first protrusions 58 and the second protrusion 60 converge, respectively, at the center line of the first prism sheet 32D that extends in the Y axis direction.

This allows the light from the light emitting elements 28 to be guided in two different directions, namely, the first direction and the second direction.

In this embodiment, a plurality of first protrusions 58 and a plurality of second protrusions 60 are formed on the prism face 40D, but this is not the only option, and a plurality of third protrusions may be further formed. In this case, each of the third protrusions is formed in a triangular prism shape. The third protrusions have third ridgelines forming the top portions of the triangular prisms. The third ridgelines are disposed parallel to each other and extend in a third direction that is perpendicular to the direction in which the lower edge 8b of the display panel 6 extends (see FIG. 2). This allows the light from the light emitting elements 28 to be guided in three different directions, namely, the first direction, the second direction, and the third direction.

MODIFICATION EXAMPLES

The image display devices according to the first to fourth embodiments of the present invention are described above, the present invention is not limited to or by these first to fourth embodiments. For example, the above embodiments may be combined with one another.

In the above embodiments, the optical sheet unit 20 (20A, 20B, 20C, 20D) has the first prism sheet 32 (32A, 32B, 32C), the diffusion sheet 34, the second prism sheet 36, and the third prism sheet 38, but the diffusion sheet 34, the second prism sheet 36, or the third prism sheet 38 may be omitted.

In the above embodiments, a case in which the image display device 2 is a liquid crystal television set is described, but this is not the only option, and it may instead be a liquid crystal display for a personal computer or the like, for example.

The image display device of the present invention can be applied as a liquid crystal television set or the like, for example.

[1] In view of the state of the known technology and in accordance with an aspect of the present invention, an image display device comprises a display panel, a plurality of light emitting elements, a reflective sheet, and a first optical sheet. The display panel is configured to display an image on a front face of the display panel. The light emitting elements are disposed along one edge of the display panel. The reflective sheet is disposed opposite a rear face of the display panel. The reflective sheet is configured to reflect light from the light emitting elements toward the rear face of the display panel. The first optical sheet is disposed between the display panel and the reflective sheet. The first optical sheet has a plurality of protrusions on a face of the first optical sheet that is opposite the reflective sheet. The protrusions have ridgelines extending along a direction that is different from a direction in which the one edge of the display panel extends.

With this aspect, the protrusions of the first optical sheet have the ridgelines extending along the direction that is different from the direction in which the one edge of the display panel extends. Consequently, the light from the light emitting elements is incident at various angles on the protrusions of the first optical sheet, so that the light is more likely to be totally reflected by the surfaces of the protrusions. The light totally reflected by the surfaces of the protrusions is reflected by the reflective sheet and is then incident on the first optical sheet. In this way, the light from the light emitting elements can be guided in a specific direction from the one edge of the display panel by the protrusions of the first optical sheet while traveling through a hollow region between the first optical sheet and the reflective sheet, for example. As a result, it is possible to suppress local brightness in the region of the display panel near the light emitting elements, and light unevenness in the display panel can be suppressed.

[2] In accordance with a preferred embodiment according to the image display device mentioned above, a cross section of each of the protrusions taken perpendicular to respective one of the ridgelines has a triangular shape.

With this aspect, the protrusions of the first optical sheet can be easily formed.

[3] In accordance with a preferred embodiment according to the image display device mentioned above, a cross section of each of the protrusions taken perpendicular to respective one of the ridgelines has an arc shape.

With this aspect, the protrusions of the first optical sheet can be easily formed.

[4] In accordance with a preferred embodiment according to any one of the image display devices mentioned above, the ridgelines are arranged parallel to each other and extend along a direction perpendicular to the direction in which the one edge of the display panel extends.

With this aspect, the light from the light emitting elements can be guided from the one edge of the display panel toward the other edge opposite the one edge.

[5] In accordance with a preferred embodiment according to any one of the image display devices mentioned above, the protrusions include a first protrusion having a first ridgeline extending along a first direction that is different from the direction in which the one edge of the display panel extends, and a second protrusion having a second ridgeline extending along a second direction that is different from the first direction and the direction in which the one edge of the display panel extends.

With this aspect, the light from the light emitting elements can be guided in two different directions from the one side of the display panel.

[6] In accordance with a preferred embodiment according to any one of the image display devices mentioned above, the first direction is perpendicular to the second direction.

[7] In accordance with a preferred embodiment according to any one of the image display devices mentioned above, the first protrusion and the second protrusion diverge as moving away from the one edge of the display panel.

[8] In accordance with a preferred embodiment according to any one of the image display devices mentioned above, the image display device further comprises a second optical sheet that is disposed between the first optical sheet and the display panel.

[9] In accordance with a preferred embodiment according to any one of the image display devices mentioned above, the first optical sheet includes a prism sheet, and the second optical sheet includes at least one of a diffusion sheet and a prism sheet.

[10] In accordance with a preferred embodiment according to any one of the image display devices mentioned above, the first optical sheet and the second optical sheet are formed integrally.

[11] In accordance with a preferred embodiment according to any one of the image display devices mentioned above, the second optical sheet has a plurality of protrusions on a face of the second optical sheet that faces away from the first optical sheet, the protrusions of the second optical sheet having ridgelines extending in the same direction as the ridgelines of the first optical sheet.

[12] In accordance with a preferred embodiment according to any one of the image display devices mentioned above, the image display device further comprises a third optical sheet disposed between the second optical sheet and the display panel.

[13] In accordance with a preferred embodiment according to any one of the image display devices mentioned above, a hollow region serving as a region through which the light from the light emitting elements passes is formed between the reflective sheet and the first optical sheet, and the light from the light emitting elements passes through the hollow region and is directed at the ridgelines of the first optical sheet.

[14] In accordance with a preferred embodiment according to any one of the image display devices mentioned above, the image display device further comprises a lens arranged relative to the light emitting elements along the one edge of the display panel.

[15] In accordance with a preferred embodiment according to any one of the image display devices mentioned above, the reflective sheet is disposed at an angle to the rear face of the display panel such that the reflective sheet and the display panel converge as moving away from the one edge of the display panel.

[16] In accordance with a preferred embodiment according to any one of the image display devices mentioned above, the image display device further comprises a rear frame having a main body portion and a side wall portion, the main body portion supporting the reflective sheet and being inclined with respect to the rear face of the display panel.

[17] In accordance with a preferred embodiment according to any one of the image display devices mentioned above, a cross section of each of the protrusions taken perpendicular to respective one of the ridgelines has a trapezoidal shape.

[18] In accordance with a preferred embodiment according to any one of the image display devices mentioned above, the first optical sheet includes a first prism sheet, and the second optical sheet includes a diffusion sheet and a second prism sheet, the diffusion sheet being disposed between the first prism sheet and the second prism sheet.

[19] In accordance with a preferred embodiment according to any one of the image display devices mentioned above, the image display device further comprises a third optical sheet including a third prism sheet, the third prism sheet being disposed between the second prism sheet and the display panel.

[20] In accordance with a preferred embodiment according to any one of the image display devices mentioned above, the third optical sheet has a plurality of protrusions on a face of the third optical sheet that faces away from the second optical sheet, the protrusions of the third optical sheet having ridgelines extending in a direction perpendicular to the ridgelines of the first optical sheet.

The image display device of the present invention allows light unevenness in a display panel to be suppressed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of an image display device in an upright position. Accordingly, these directional terms, as utilized to describe the image display device should be interpreted relative to an image display device in an upright position on a horizontal surface. The terms "left" and "right" are used to indicate the "right" when referencing from the right side as viewed from the front of the image display device, and the "left" when referencing from the left side as viewed from the front of the image display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An image display device comprising:
    a display panel that displays an image on a front face of the display panel;
    a plurality of light emitting elements disposed along one edge of the display panel;
    a reflective sheet disposed opposite a rear face of the display panel, the reflective sheet reflecting light from the light emitting elements toward the rear face of the display panel; and
    a first optical sheet disposed between the display panel and the reflective sheet, the first optical sheet having a plurality of protrusions on a face of the first optical sheet that is opposite the reflective sheet,
    the protrusions having ridgelines extending along a direction that is different from a direction in which the one edge of the display panel extends,
    the protrusions including
        a plurality of first protrusions having a plurality of first ridgelines, respectively, the first ridgelines being parallel to each other and extending along a first direction that is different from the direction in which the one edge of the display panel extends, and
        a plurality of second protrusions having a plurality of second ridgelines, respectively, the second ridgelines being parallel to each other and extending along a second direction that is different from the first direction and the direction in which the one edge of the display panel extends the first direction being perpendicular to the second direction.

2. The image display device according to claim 1, wherein the protrusions protrude towards the reflective sheet.

3. The image display device according to claim 1, wherein
a cross section of each of the protrusions taken perpendicular to respective one of the ridgelines has a triangular shape.

4. The image display device according to claim 1, wherein
a cross section of each of the protrusions taken perpendicular to respective one of the ridgelines has an arc shape.

5. The image display device according to claim 1, wherein
the first protrusions and the second protrusions diverge as moving away from the one edge of the display panel.

6. The image display device according to claim 1, further comprising
a second optical sheet disposed between the first optical sheet and the display panel.

7. The image display device according to claim 6, wherein
the first optical sheet includes a prism sheet, and
the second optical sheet includes at least one of a diffusion sheet and a prism sheet.

8. The image display device according to claim 6, wherein
the first optical sheet and the second optical sheet are formed integrally.

9. The image display device according to claim 6, wherein
the second optical sheet has a plurality of protrusions on a face of the second optical sheet that faces away from the first optical sheet, the protrusions of the second optical sheet having ridgelines extending in the same direction as the ridgelines of the first optical sheet.

10. The image display device according to claim 6, further comprising
a third optical sheet disposed between the second optical sheet and the display panel.

11. The image display device according to claim 1, wherein
a hollow region serving as a region through which the light from the light emitting elements passes is formed between the reflective sheet and the first optical sheet, and
the light from the light emitting elements passes through the hollow region and is directed at the ridgelines of the first optical sheet.

12. The image display device according to claim 1, further comprising
a lens arranged relative to the light emitting elements along the one edge of the display panel.

13. The image display device according to claim 1, wherein
the reflective sheet is disposed at an angle to the rear face of the display panel such that the reflective sheet and the display panel converge as moving away from the one edge of the display panel.

14. The image display device according to claim 1, further comprising
a rear frame having a main body portion and a side wall portion, the main body portion supporting the reflective sheet and being inclined with respect to the rear face of the display panel.

15. The image display device according to claim 1, wherein
a cross section of each of the protrusions taken perpendicular to respective one of the ridgelines has a trapezoidal shape.

16. The image display device according to claim 6, wherein
the first optical sheet includes a first prism sheet, and
the second optical sheet includes a diffusion sheet and a second prism sheet, the diffusion sheet being disposed between the first prism sheet and the second prism sheet.

17. The image display device according to claim 16, further comprising
a third optical sheet including a third prism sheet, the third prism sheet being disposed between the second prism sheet and the display panel.

18. The image display device according to claim 17, wherein
the third optical sheet has a plurality of protrusions on a face of the third optical sheet that faces away from the second optical sheet, the protrusions of the third optical sheet having ridgelines extending in a direction perpendicular to the ridgelines of the first optical sheet.

* * * * *